United States Patent [19]

Alvyn

[11] Patent Number: 4,930,753
[45] Date of Patent: Jun. 5, 1990

[54] MOLDABLE EDGE CONNECTING APPARATUS

[76] Inventor: Alvin E. Alvyn, P.O. Box 450222, Miami, Fla. 33245-0222

[21] Appl. No.: 230,608

[22] Filed: Aug. 10, 1988

[51] Int. Cl.$^5$ ............... E04H 17/00; F16C 11/00; E05D 7/00
[52] U.S. Cl. .................... 256/26; 403/117; 403/161; 403/339; 403/340; 256/19; 256/25; 16/262; 16/270; 16/272; 16/DIG. 13
[58] Field of Search ............ 403/364, 339, 340, 319, 403/117, 161, 355, 356, 294; 256/26, 19, 25; 16/262, 270, 272, 387, DIG. 13; 425/577, DIG. 58

[56] References Cited

U.S. PATENT DOCUMENTS

| | | | |
|---|---|---|---|
| 2,628,823 | 2/1953 | Rhome et al. | 256/26 |
| 3,462,181 | 8/1969 | Lewis | 403/364 X |
| 3,484,081 | 12/1969 | Rowan | 256/22 |
| 3,711,066 | 1/1973 | Niemec | 256/19 |
| 4,174,096 | 11/1979 | Campbell | 256/19 X |
| 4,357,000 | 11/1982 | Tisbo et al. | 256/26 |
| 4,407,534 | 10/1983 | Pete | 403/364 X |

FOREIGN PATENT DOCUMENTS 3340671  5/1985  Fed. Rep. of Germany ...... 403/294
1381538  10/1963  France .................... 256/26

Primary Examiner—Andrew V. Kundrat
Assistant Examiner—Franco S. De Liguori
Attorney, Agent, or Firm—Robert J. Van Der Wall

[57] ABSTRACT

A moldable edge connecting apparatus is disclosed that can optionally be employed as a hinge. It is suitable for use as fencing and is particularly applicable to removable fencing. It employs integrally molded connecting fingers that are designed without deep slots, lips thereover, or fully circumscribed openings to economize on mold manufacturing cost and the expense and difficulty of operating the mold, rendering the invention appropriate to very low cost items. The entire structure is substantially coplanar with segments to be connected, even when used as a hinge, and utilizes half-round grooves that are substantially no deeper than the radius of the groove.

17 Claims, 2 Drawing Sheets

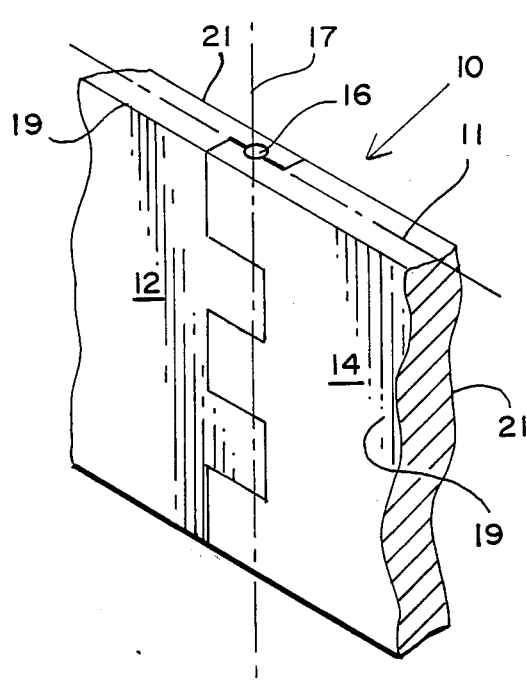
FIG.1
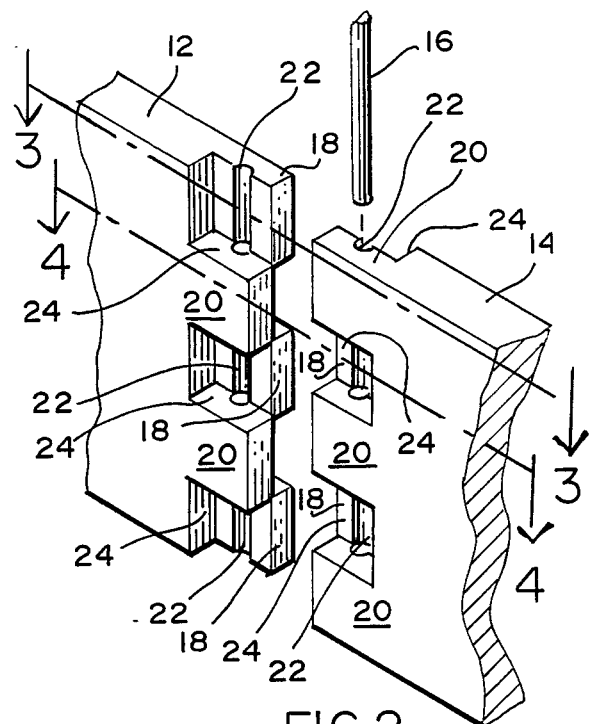
FIG.2
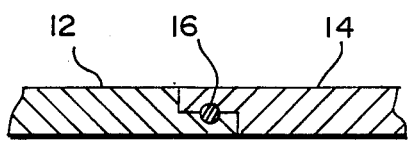
FIG.4
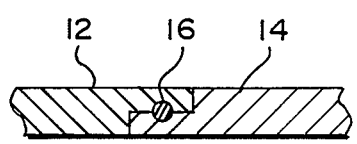
FIG.3
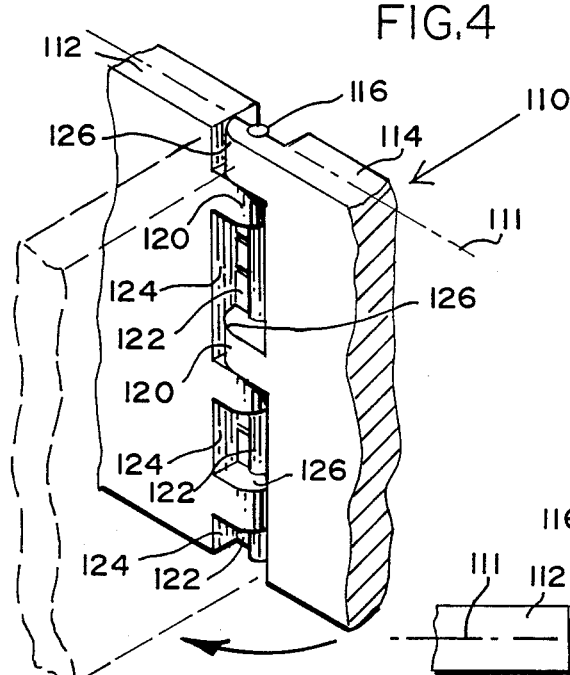
FIG.5
FIG.7
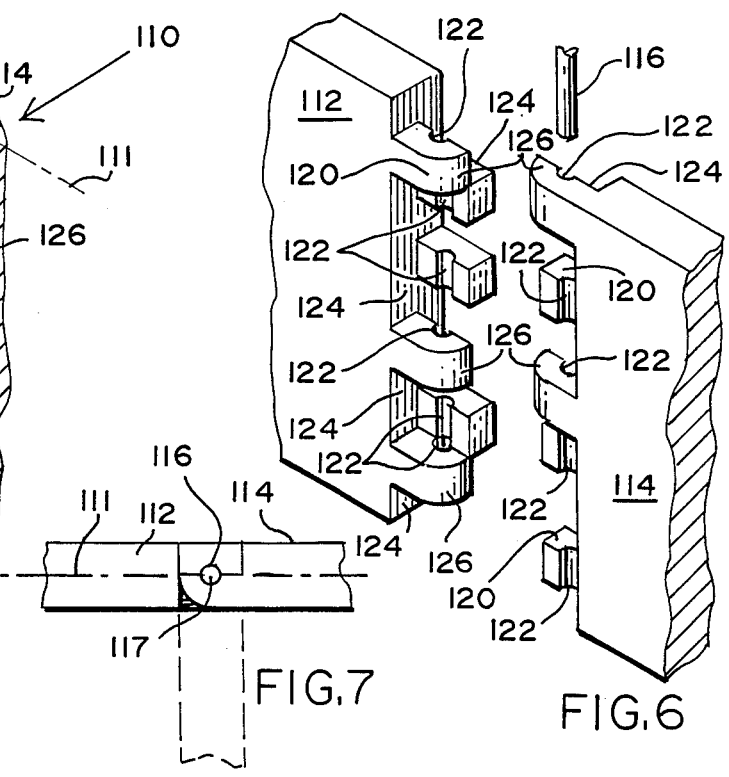
FIG.6

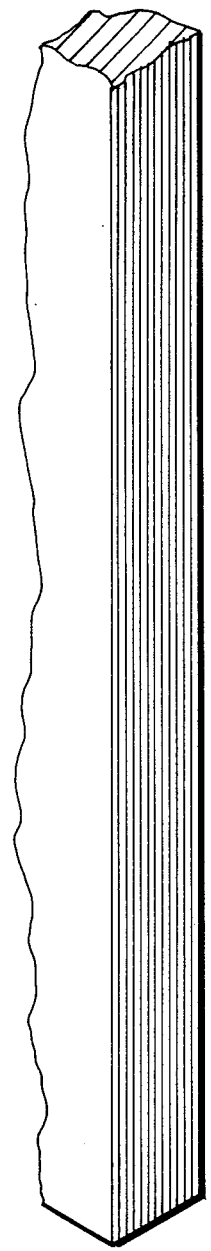
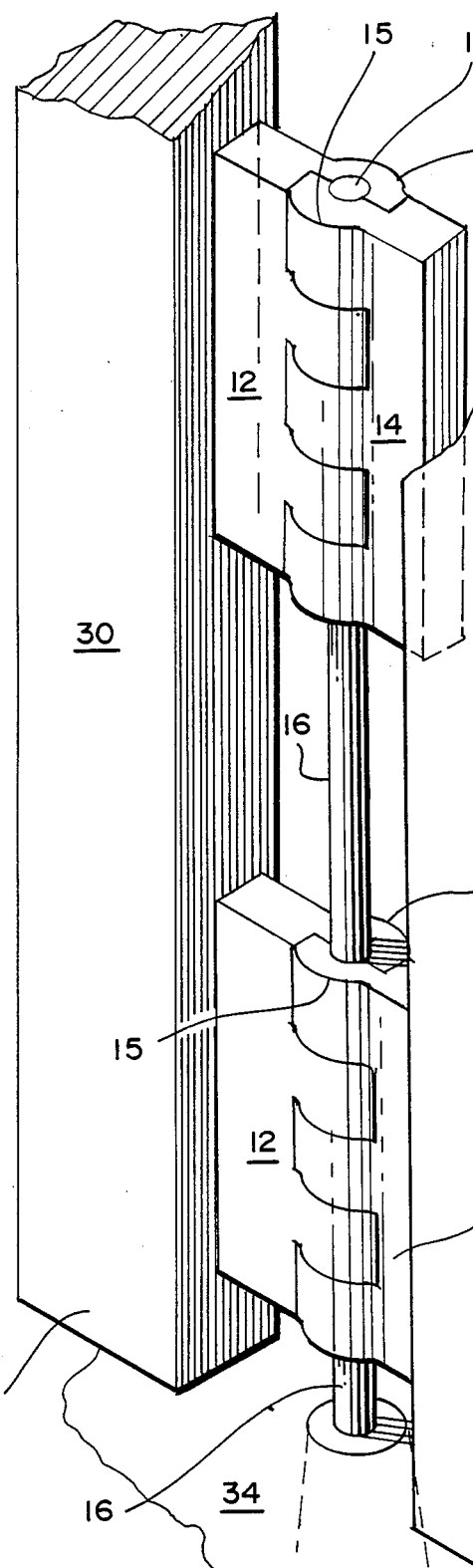
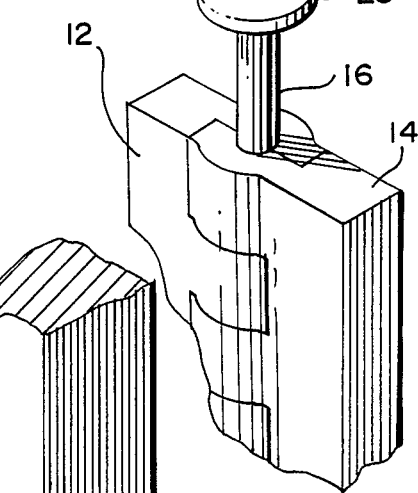
FIG. 8  FIG. 9  FIG. 10

MOLDABLE EDGE CONNECTING APPARATUS

FIELD OF THE INVENTION

The invention relates to the field of connecting apparatus in general and to the field of moldable edge surface connectors in particular, especially as applied to fencing.

BACKGROUND OF THE INVENTION

The present invention provides a novel and practical means of joining edge surfaces and other structural configurations together while taking advantage of the low cost production methods as are made possible by very low cost forms of plastic molding. Although the present invention may be employed in many ways, it is especially adapted to use in readily removable plastic fences and other enclosing structures. The novel construction of the present invention permits the connection of fencing or panel segments to form a structure that is limited only by the area available for enclosure. A variant model is disclosed that provides a movable connection that permits the forming of a corner even though the pivot of the corner is substantially coplanar with a midline of the segments on either side of the corner and allows the construction of an enclosure such as a low fence enclosing a flower garden to follow a meandering or random course, as well as around areas bounded by obtuse and right angles and can accommodate acute angles in an alternative embodiment that compromises the midline pivot location.

The design of the present invention permits the quick and easy insertion or removal of a segment of an enclosure without disturbing adjacent connected segments. A hinge pin described herein as a joining rod may be of a length great enough to extend below the lower edge of a fencing and form a fence post to support the fencing in an upright position. If optional corresponding anchor blocks are installed in the ground and are provided with an opening to receive the extended lower extremity of the joining rod, the fencing or segments thereof may be independently lifted from the ground surface, allowing for mowing of grass or trimming other vegetation requiring same, each segment of the fencing then may be readily and independently returned to the identical original position by simple insertion of the extended joining rods into the openings in the anchor blocks. This feature is just one of those which serve to distinguish the present invention from the prior art. Although the foregoing descriptions have been directed to a low fencing as for flower gardens, it is not intended to limit the present invention to use with small enclosures as the construction of the connecting apparatus permits use with larger and heavier structures such as doors.

A search of the prior art discloses a number of joining arrangements, such as various hinges, that differ from the novel construction of the connection aspects of the present invention. The best example of this is found in U.S. Pat. No. 2,012,800 by Allen, in which a series of knuckles having a deep slot therein are engaged with an opposing series of knuckles, also having such slots. Both sets of deeply slotted knuckles are joined by a long hinge pin, for hinging a lid to a rectangular box. But the hinge pin is not substantially coplanar with the midline of segments being connected. It is important to note that this deep slot arrangement extends beyond the axis of the hinge pin to a substantial degree. The reason that this is important is that the present invention utilizes only shallow half round grooves that are no deeper than the radius of the groove. The significance of this seemingly modest design change from such prior art references as Allen cannot be overestimated. That is because one aspect of the present invention is directed to rendering the molding of edge connecting apparatus very inexpensive, because by doing so, the advantages of the invention can be extended to any molded product requiring edge connection or a hinge, no matter how inexpensive. In the mold construction and use arts, the differences in design and manufacturing costs and in operational economy are considerable if deep slots, lips thereover, and especially fully circumscribed openings, can be avoided. A joining rod axis that is substantially coplanar with the midline of segments to be connected is an important added advantage. It is that latter feature which is missing from Petz, U.S. Pat. No. 4,407,534, even though the half-round groove feature is taught.

None of the other, prior art shown in the present inventor's search or knowledge meet these objectives. Other references are Apfelbaum, U.S. Pat. No. 2,347,980; Derham, U.S. Pat. No. 2,601,101; Sunka. U.S. Pat. No. 2,766,901; and Kiba, U.S. Pat. No. 2,762,076, Campbell U.S. Pat. No. 4,174,096, Lewis, U.S. Pat. No. 3,462,181, and French Patent No. 1,381,538.

Also of interest is the disclosure of Saunders, et al.. U.S. Pat. No. 2,495,605, illustrating a hinge for use with aircraft control surfaces. Although this design permits the connection of edge surfaces, projecting portions of the connecting structure must pass through a fully circumscribed opening in the structure to which it will join, and be held against separation by a long pin passing through the two joining sections, a construction that is avoided by the present invention as above indicated. One more interesting reference is Voit, West German Patent No. 3,340,671, which shows a tightly interlocking construction but omits the half-round grooves and joining rod.

The present invention offers a novel connecting device that can be assembled very quickly and easily due to the novel connecting fingers that are spaced apart with only a half round groove in each finger. The grooves alternately facing toward the mid-line of the connector body and joined together by a joining rod that is inserted after the connecting edges have been placed in position. This construction allows for each connection without turning or twisting of the connecting fingers and allows a direct edge-to-edge connection. It particularly allows for a more simplified mold construction for molding of component parts permitting the design applicability for very low cost molded items. The particular application for which the edge connecting features of the present invention are most immediately directed are enclosures such as decorative fences that are preferably selectively removable as used in combination with vegetation such as lawns and flower gardens.

There exist plastic molded decorative fences in the prior art. Several examples are Niemiec, U.S. Pat. No. 3,711,066 and Tisbo, et al., U.S. Pat. No. 4,357,000. In this art which also includes deep slots, each segment contains a plurality of spikes, usually two or three, which can be placed into the lawn or other ground surface. But this art includes a design or utilization flaw which the present invention overcomes. When a first segment of such fencing is placed into the ground, a second segment cannot be readily attached because the second segment, in order to be attached, must be lowered into the ground to be aligned for attachment, but will not readily be aligned once placed into the ground.

This flaw is overcome by the present invention because the joining rod or hinge pin is used both to assemble first and second segments of the fence to each other, and also extends downwardly into the ground to provide support for both segments that it has assembled and connected together. Further, the joining rod's lower extremity may be removably placed in an opening in an anchor block that has an upper surface which may be disposed flush or coplanar with the surface of the ground. Then each segment of the fencing may be removed independently of adjoining segments and replaced in the same identical position as fixed by the anchor blocks.

SUMMARY OF THE INVENTION

Bearing in mind the foregoing, it is a principal object of the present invention to provide a moldable edge connector that employs comparatively shallow half-round grooves in the connecting fingers so it can be fabricated in a simplified mold in which deep slots, lips thereover, and fully circumscribed openings are not necessary in the mold. Thus, manufacturing cost of the mold is greatly reduced and operating economics are achieved.

A primary object of the present invention is to provide a moldable edge connector that has connecting fingers respectively integral and coplanar with a midline of the segments to be connected to further simplify the mold, further reducing its manufacturing cost and accentuating operating economics.

It is a further object of the present invention to provide the shallow half-round groove in the connecting fingers of the connector, preferably in a substantially coplanar configuration, which can be made in the form of a hinge and will provide a strong and durable connection while not forsaking the foregoing economics.

It is a still further object of the present invention to provide a moldable edge connector that may be used in the construction of various types of fences.

It is an additional object of the present invention to provide a moldable edge connector that when used in the construction of fences, will allow a segment of such fence to be readily removed without disturbing the remaining fence segments.

A related object of the invention is to combine the moldable connecting feature of the present invention as used in fencing with an extended joining rod and anchor blocks to facilitate removal of any segment independently or all of the fencing to permit cutting of a lawn or the like without tedious close quarters trimming, and then facilitate rapid replacement of the fencing in the identical original locations.

One more object of the present invention is to provide a moldable edge connector that may be modified to connect at an angle and that may also be used as a hinge.

In accordance with the invention, there is provided a connecting apparatus or device particularly adapted for use with low cost molding techniques. It includes connecting fingers in opposed pairs, each connecting finger being molded integrally with the segment to which it is attached. The connecting fingers are molded with half round grooves therein that are coaxial with each other and with a joining rod placed therein to complete the connection and hold it together. The connecting fingers, half round grooves, and joining rod are coplanar with a midline disposed within sidewalls of at least one of the segments to be connected. The elimination of deep slots, lips thereover, and fully circumscribed openings greatly reduce mold manufacturing costs and effect operating economics. The connecting apparatus of the invention is appropriate for use not only for connecting segments together, but is adaptable for use as a hinge with any slight modification that do not sacrifice mold manufacturing cost savings or operating economics.

In accordance with another aspect of the invention, there is provided an embodiment of the invention employing extended joining rods which double as fence posts when the segments are portions of a fence. The joining rod extensions are inserted into the earth. This construction facilitates removal and reassembly of each fence portion independently of adjoining fence portions. A further aspect of the invention includes use of anchor blocks having openings to removably receive joining rod extensions being employed as fence posts. The anchor blocks may optionally be inserted into the earth so the upper surface thereof is flush with the ground surface. Fencing can then be readily removed and replaced in identical locations so that vegetation can be trimmed.

An ideal use of the invention is for fencing around a flower garden which is surrounded by a lawn. The fencing, or portions thereof, may be readily removed to mow the lawn and then quickly and accurately replaced, eliminating the need either for close-in trimming or for cumbersome reassembly of prior art fencing.

The invention will be better understood after reading the following detailed description of the embodiments thereof with reference to the appended drawings, in which:

BRIEF DESCRIPTION OF THE DRAWINGS

FIG. 1 is a perspective view showing the assembled invention.

FIG. 2 is a perspective view showing the disassembled invention.

FIG. 3 is a cross-sectional view of the assembled invention taken al the line 3—3 of FIG. 2.

FIG. 4 is a cross-sectional view of the assembled invention taken along the line 4—4 of FIG. 2.

FIG. 5 is a perspective view of a variant model in a first assembled position with a second position shown in phantom.

FIG. 6 is a disassembled perspective view of the variant model.

FIG. 7 is a top view of the assembled variant model in a first assembled position with a second position shown in phantom.

FIG. 8 is a perspective view of a molded plastic fence section showing one-half of the present invention molded integrally together with the fence segment, and another half as molded integrally together with another segment of fencing which could be a gate, and joined by a joining rod that can also serve as a fence post, extended into an optional anchor block disposed in the ground.

FIG. 9 is a perspective view of the bottom of the joining rod when the same is used as a fence post in combination with an anchor block.

FIG. 10 is a fragmentary perspective view of an alternative embodiment of the top of a joining rod.

DETAILED DESCRIPTION

Referring to the drawings by characters of reference, FIG. 1 presents a perspective view of the edge connector 10. The edge connector as shown in FIG. 1 has been assembled with the segment 12 joined together with the segment 14 by the joining rod 16. The segments 12 and 14 each have a common centerline 11, which passes through the axis 17 of the joining rod 16 also referred to as rod axis 17. The centerline 11 may also constitute a midline for purposes of establishing that the moldable edge connector 10 and particularly the rod axis 17 of joining rod 16 is substantially coplanar with the segments 12 and 14 to be connected. This is not to say, however, that the term substantially coplanar requires the midline to coincide with centerline 11. The midline may be anywhere within the sidewalls 19 and 21 of segments 12 and 14 and still be substantially coplanar. This is because the term substantially coplanar in this context refers to the entire thickness of the segments to be joined, and not a single plane in a pure geometric sense.

Turning now to FIG. 2, a perspective exploded view is presented. The molded recess 24 is formed in the segment 12 and the segment 14 to receive the corresponding connector fingers 20 and 18. When the connector fingers 20 and 18 are properly engaging the molded recesses 24, the shallow half round grooves 22 will be in alignment with each other and permit the insertion of the joining rod 16 therein to prevent the separation of the two segments, 12 and 14. Connector fingers 18 and 20 are referred to an opposed pair because taken together they face opposing directions. Viewed from above, they appear to completely circumscribe joining rod 16 without actually doing so and with no slot or groove depth greater than half round. The opposing engagement of the connector fingers 18 and 20 prevent the lateral and vertical separation of the connector segments 12 and 14. The close fit of the opposing half round grooves 22 with the joining rod 16, prevents the linear separation of the segments 12 and 14. It will be seen that the embodiment of the invention shown in FIGS. 1 and 2 do not permit pivoting of the segments held together by joining rod 16. This is because connecting fingers from both segments interleave and interlock with each other in the manner of a three dimensional puzzle.

FIG. 3 presents a cross-sectional view of the assembled invention showing the segment 12 joined together with the segment 14 and held together by the joining rod 16. The view is taken along the line 3—3 of FIG. 2.

FIG. 4 shows a cross-sectional view with the segments 12 and 14 assembled and held together by the joining rod 16. The view is taken along the line 4—4 of FIG. 2.

Turning now to FIG. 5, a variant model is illustrated in which the connector 110 is comprised of the segment 112 and the segment 114. The variant connector 10 is constructed to permit the pivoting movement of one segment in relation to the other in the manner of a hinge. This movement is made possible by two things.

The first is that connector fingers are not interleaved as shown in FIGS. 1-4, but alternate along the rod axis 17 of the joining rod 16. That is, there is no plane perpendicular to the rod axis 17 of joining rod 16 which contains connecting fingers from both segments, as was particularly evident in FIGS. 3 and 4.

The second thing that makes possible pivoting movement of one segment with respect to the other, is providing the radius 126 on the end surface of the connector finger 120 and providing clearance during pivoting movement of the two segments 112 and 114 with respect to joining rod 116. Although the drawing shows the radius 126 only on the connector finger 120 and allowing turning only in one direction, it will be apparent to those skilled in the art that a similar radius may be provided at the end surface of each connector finger and thereby allow rotation in two directions. Centerline 111 is also seen. The ability to pivot the connector fingers as provided in the variant connector 110 allows the creation of a corner when the connector is used in the building of an enclosing wall or fence or when used with a closure such as a gate or other movable opening such as a door. Still, there is no departure from the feature that no slot or groove is deeper than half round, i.e., not greater (except for minor clearances) than the radius of the joining rod.

FIG. 6 presents a perspective exploded view of the present invention and shows the radii 126 on the end surfaces of the connector fingers 120 to allow clearance for pivotal movement of connector segments 112 and 114. The connector fingers 120 fit into the molded recesses 124 and are held together in an assembled position by the insertion of the joining rod 116 through the then aligned half round grooves 122, in the manner as shown in FIGS. 1-4.

FIG. 7 is a top view of the variant model showing the segment 112, the segment 114 in a parallel position and in a turned position in phantom, and also the joining rod 116, its rod axis 117 and centerline 111.

FIG. 8 illustrates the use of the invention to connect two sections of molded plastic fencing, 30 and 32. The one half 12 of the edge connector, is molded together with the fence segment 30 as a single unit. The other half 14 of the edge connector is molded together with the fence segment 32 as a single unit. The edge connector halves 12 and 14 are joined together by the joining rod 16. The diameter of the joining rod 16 must be varied to provide sufficient strength to support a fence and the size and thickness of the connector halves must be varied to conform with the diameter of the joining rod 16. The exterior surfaces of edge connector halves 12 and 14 may optionally include exterior surfaces 13 and 15 that are radiused on the same axis as joining rod 16, as illustrated. The pattern of the foregoing parts may be repeated one or more times as shown, using the same part numbers.

Turning now to FIG. 9, and referring to the same application of the present invention, the joining rod 16 extends below the segments, and further extends below the surface of the ground 34 to serve as a fence post. If the structure of the invention is desired to be removed for brief intervals periodically, anchor blocks 36 may optionally be installed so the upper surface 38 thereof is substantially flush or coplanar with the surface of ground 34. One purpose is that if fencing is installed on or adjacent to a lawn planted in ground 34, each appropriate segment of the fence may be removed along with joining rods 16 from the opening in anchor block 36. The lawn may then be mowed without interference, especially since upper surfaces 38 of anchor blocks 36 will not conflict therewith. Then joining rods 16 may be readily reinserted into the openings of anchor blocks 36, relocating same in the exact positions as before mowing. This facilitates moving without clipping or trimming in close proximity to a fence, in lieu of removing same and relocating and reinstalling it with great difficulty. Each segment may be independently removed and replaced.

FIG. 10 shows a fragmentary perspective view of an alternative embodiment of joining rod 16 with a head 23 in the form of a large nail. Head 23 facilitates easy removal of joining rod 16 from segments 12 and 14, and also acts as a retainer.

Having described the presently preferred embodiments of the invention, it should be understood that various changes in construction and arrangement will be apparent to those skilled in the art and are fully contemplated herein without departing from the true spirit of the invention. Accordingly, there is covered all alternatives, modifications and equivalents as may be included within the spirit and scope of the invention as defined in the appended claims.

I claim:

1. In an improved edge connecting apparatus having connecting fingers respectively molded integrally with each segment to be connected, the improvement comprising:
   a first segment having first connecting fingers in opposed pairs and defining therein half-round grooves coaxial with each other;
   a second segment having second connecting fingers in opposed pairs and defining therein half-round grooves coaxial with each other, said grooves being not substantially deeper than their radius;
   a joining rod having a rod axis coaxial with and passing through the half-round grooves of the connecting fingers of each segment, said rod axis being substantially coplanar with a midline disposed within sidewalls of at least one of the segments to be connected;
   said first connecting fingers alternating with said second connecting fingers along the rod axis of the joining rod; and
   the connecting fingers of at least one segment having end surfaces radiused coaxial with the half-round grooves such that the segments can pivot with respect to each other about the rod axis as a hinge.

2. The connecting apparatus of claim 1 wherein the midline is coincident with a centerline of at least one of the segments to be connected.

3. The connecting apparatus of claim 1 in which the joining rod is extended beyond the segments.

4. The connecting apparatus of claim 3 wherein a portion of the joining rod extended beyond the segments cooperates with an external body to provide support to the segments through the connecting apparatus.

5. The connecting apparatus of claim 4 where the external body is the earth, the joining rod being inserted therein, and the segments constitute portions of a fence supported solely by the joining rod.

6. The connecting apparatus of claim 5 which further comprises an anchor block having an opening adapted to removably receive a joining rod.

7. The connecting apparatus of claim 6 in which the anchor block is disposed flush with the earth such that vegetation trimming devices such as a mower may pass directly thereover without interference when the joining rod is removed therefrom.

8. In an improved edge connecting apparatus having connecting fingers respectively molded integrally with each segment to be connected, the improvement comprising:
   first segment connecting fingers in opposed pairs and defining therein half-round grooves coaxial with each other;
   second segment connecting fingers in opposed pairs and defining therein half-round grooves coaxial with each other and with the half-round grooves of the first segment connecting fingers, said grooves being not substantially deeper than their radius;
   a joining rod having a rod axis coaxial with and passing through the half-round grooves of the first and second segment connecting fingers, said rod axis being substantially coplanar with a midline disposed within sidewalls of at least one of the segments to be connected;
   said first connecting fingers alternating with said second connecting fingers along the rod axis of the joining rod; and
   the connecting fingers of at least one segment having end surfaces radiused coaxial with the half-round grooves such that the segments can pivot with respect to each other about the rod axis as a hinge.

9. The connecting apparatus of claim 8 wherein the midline is coincident with a centerline of at least one of the segments to be connected.

10. The connecting apparatus of claim 8 in which the joining rod is extended beyond the segments.

11. The connecting apparatus of claim 10 wherein a portion of the joining rod extended beyond the segments cooperates with an external body to provide support to the segments through the connecting apparatus.

12. The connecting apparatus of claim 11 where the external body is the earth, the joining rod being inserted therein, and the segments constitute portions of a fence supported solely by the joining rod.

13. The connecting apparatus of claim 12 which further comprises an anchor block having an opening adapted to removably receive the joining rod.

14. The connecting apparatus of claim 13 in which the anchor block is disposed flush with the earth such that vegetation trimming devices such as a mower may pass directly thereover without interference when the joining rod is removed therefrom.

15. In an improved edge connecting apparatus having connecting fingers respectively molded integrally with each segment to be connected, the improvement comprising:
   first segment connecting fingers in opposed pairs and defining therein half-round grooves coaxial with each other;
   second segment connecting fingers in opposed pairs and defining therein half-round grooves coaxial with each other and with the half-round grooves of the first segment connecting fingers said grooves being not substantially deeper than their radius;
   a joining rod having a rod axis coaxial with and passing through the half-round grooves of the first and second segment connecting fingers, said rod axis being coplanar with a midline disposed within sidewalls of at least one of the segments to be connected, said joining rod being extended beyond the segments to be inserted into the earth as a fence post, providing sole support for the segments constituting portions of a fence;
   said first connecting fingers alternating with said second connecting fingers along the rod axis of the joining rod; and the connecting fingers of at least one segment having end surfaces radiused coaxial with the half-round grooves such that the segment can pivot with respect to each other about the rod axis as a hinge.

16. The connecting apparatus of claim 15 which further comprises an anchor block having an opening adapted to removably receive the joining rod.

17. The connecting apparatus of claim 16 in which the anchor block is disposed flush with the earth such that vegetation trimming devices as a mower may pass directly thereover without interference when the joining rod is removed therefrom.

* * * * *